(12) United States Patent
Testolin et al.

(10) Patent No.: US 11,695,359 B2
(45) Date of Patent: Jul. 4, 2023

(54) AUTONOMOUS APPARATUS

(71) Applicant: Positec Power Tools (Suzhou) Co., Ltd, Jiangsu (CN)

(72) Inventors: Federico Testolin, Vicenza (IT); Davide Dalfra, Vicenza (IT)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 0 days.

(21) Appl. No.: 17/050,346

(22) PCT Filed: Apr. 24, 2019

(86) PCT No.: PCT/CN2019/084150
§ 371 (c)(1),
(2) Date: Oct. 23, 2020

(87) PCT Pub. No.: WO2019/206198
PCT Pub. Date: Oct. 31, 2019

(65) Prior Publication Data
US 2021/0384856 A1   Dec. 9, 2021

(30) Foreign Application Priority Data
Apr. 24, 2018 (CN) .......................... 201810374952.8

(51) Int. Cl.
*H02P 5/74* (2006.01)
*H02P 6/06* (2006.01)
(Continued)

(52) U.S. Cl.
CPC .............. *H02P 21/18* (2016.02); *H02P 21/22* (2016.02); *H02P 27/12* (2013.01); *A01D 34/008* (2013.01);
(Continued)

(58) Field of Classification Search
CPC ............. H02P 21/18; H02P 6/28; H02P 21/26
See application file for complete search history.

(56) References Cited

U.S. PATENT DOCUMENTS

| 2005/0179416 A1* | 8/2005 | Iribe ....................... B25J 9/1674 318/563 |
| 2009/0309531 A1* | 12/2009 | Hamahata ................. H02P 6/04 318/565 |

(Continued)

FOREIGN PATENT DOCUMENTS

| CN | 1248325 A | 3/2000 |
| CN | 103208965 B | 7/2013 |

(Continued)

*Primary Examiner* — Kawing Chan
*Assistant Examiner* — Charles S Laughlin
(74) *Attorney, Agent, or Firm* — Dentons US LLP

(57) ABSTRACT

The disclosure relates to an autonomous apparatus, moving and performing preset work in a defined working area, the autonomous apparatus including an energy module supplying energy to the autonomous apparatus, a motor, a sensor circuit, and a control circuit, the motor obtaining the energy from the energy module, to drive the autonomous apparatus to move and/or work in the working area, the sensor circuit detecting working parameters and environmental parameters of the autonomous apparatus, and transmitting detection results to the control circuit, the control circuit controlling the operation of the motor according to a signal transmitted by the sensor circuit, where the motor is a sensorless brushless motor, and before the motor rotates, the control circuit measures a resistance value of the motor, and estimates, one the basis of the resistance value of the motor, a rotor position of the motor, so as to control the operation of the motor.

9 Claims, 9 Drawing Sheets

(51) Int. Cl.
    *H02P 8/14*      (2006.01)
    *H02P 21/18*     (2016.01)
    *H02P 21/22*     (2016.01)
    *H02P 27/12*     (2006.01)
    *A01D 34/00*     (2006.01)
    *A01D 34/64*     (2006.01)
    *A01D 34/74*     (2006.01)
    *A01D 34/78*     (2006.01)

(52) U.S. Cl.
    CPC .............. *A01D 34/64* (2013.01); *A01D 34/74* (2013.01); *A01D 34/78* (2013.01)

(56) References Cited

U.S. PATENT DOCUMENTS

2016/0094167 A1* 3/2016 Kim .................. H02P 6/182
                                                318/400.09
2018/0115264 A1* 4/2018 Hano ................. H02P 6/18

FOREIGN PATENT DOCUMENTS

| CN | 103973187 A   | 8/2014  |
| CN | 104521417 A   | 4/2015  |
| CN | 204362577 U   | 6/2015  |
| CN | 104521417 B   | 9/2016  |
| CN | 106208878 A   | 12/2016 |
| CN | 107291077 A   | 10/2017 |
| DE | 19709296 A1   | 9/1998  |
| EP | 3232291 A1    | 10/2017 |
| JP | 2001-211699 A | 8/2001  |
| JP | 4434402 B2    | 3/2010  |
| JP | 2014007916 A  | 1/2014  |
| KR | 101738085 B1  | 5/2017  |

* cited by examiner

AUTONOMOUS APPARATUS

This application is a National Stage Application of International Application No. PCT/CN2019/084150, filed on Apr. 24, 2019, which claims benefit of and priority to Chinese Patent Application No. 201810374952.8, filed on Apr. 24, 2018, all of which are hereby incorporated by reference in their entirety for all purposes as if fully set forth herein.

BACKGROUND

Technical Field

The present invention relates to an autonomous apparatus.

Related Art

An autonomous apparatus such as a robotic lawnmower is a device that walks and works under autonomous control. To implement autonomous control, in terms of the hardware of the autonomous apparatus, a walking motor and a working motor that respectively drive walking and working, sensors that separately sense an internal environment and an external environment, and a controller that controls the walking motor and the working motor according to information from the sensors are disposed. The walking motor drives movement of the autonomous apparatus, and the working motor drives a working part to perform preset work content such as mowing, vacuuming, spraying, and welding.

A robotic lawnmower is used as an example. During autonomous work, the work to be completed by a walking motor includes steering, reversing, constant speed operation, variable speed operation, stopping, walking, and the like. The work to be completed by a working motor includes forward rotation, reverse rotation, constant speed operation, variable speed operation, stopping work, and the like. To complete the work, the controller needs to accurately control the motor. Meanwhile, it is necessary to switch between different work content, so that frequent control of the start and stop of the motor is required.

Generally, the motor includes a brushed motor and a brushless motor. Considering the service life of the autonomous apparatus, generally, the walking motor and the working motor are both brushless motors. The brushless motor further includes a brushless motor provided with a sensor for detecting a rotor position and a brushless motor provided with no sensor for detecting a rotor position (hereinafter referred to as a sensorless motor). Considering that the sensorless motor has low costs and there is no problem of inaccurate position detection caused by sensor position deviation due to long-term work, preferably, sensorless motors are selected as the walking motor and the working motor of the autonomous apparatus.

In a case that there is no sensor, to obtain a rotor position and a rotor speed, accurate motor parameter information such as a stator resistance and a stator inductance is required to estimate the rotor position and/or speed. Therefore, the sensorless motor is sensitive to changes in the stator resistance and the stator inductance. However, the stator resistance of the motor highly depends on temperature. For example, the temperature rises from 20° C. to 40° C., the resistance of copper or aluminum that is commonly used as a winding material of the motor increases by more than 15%. Such a resistance change introduces an error into the position and speed estimation. As a result, control performance deteriorates at a low speed or even the motor fails to start. This is unacceptable for the autonomous apparatus that requires frequent control of the start and stop of the motor, because the motor fails to start frequently and the autonomous apparatus cannot work autonomously.

SUMMARY

A technical solution adopted in embodiments of the present invention to resolve problems in the prior art is as follows: An autonomous apparatus, moving and performing preset work in a defined working area, the autonomous apparatus comprising an energy module supplying energy to the autonomous apparatus, a motor, a sensor circuit, and a control circuit, the motor obtaining the energy from the energy module, to drive the autonomous apparatus to move and/or work in the working area, the sensor circuit detecting a working parameter and an environmental parameter of the autonomous apparatus, and transmitting a detection result to a control circuit, the control circuit controlling the operation of the motor according to a signal transmitted by the sensor circuit, wherein the motor is a sensorless brushless motor, and before the motor rotates, the control circuit measures a resistance value of the motor and estimates a rotor position of the motor based on the resistance value of the motor, to control the operation of the motor.

Optionally, the control circuit comprises an inverter circuit, the control circuit applies a first voltage value V1 to any two phases of the motor through the inverter circuit, so that a phase current flowing through the motor reaches a first current value I1, the control circuit applies a second voltage value V2 to any two phases of a brushless motor through the inverter circuit, so that the phase current flowing through the motor reaches a second current value I2, and the control circuit measures the resistance value of the motor based on the first voltage value V1, the first current value I1, the second voltage value V2, and the second current value I2.

Optionally, in a process of applying a voltage to any two phases of the motor by the control circuit, a duty ratio is gradually increased until the phase current flowing through the motor reaches the first current value I1 or the second current value I2.

Optionally, the control circuit is a field oriented control (FOC) control circuit.

Optionally, when the control circuit determines, based on the rotor position of the motor, that a rotation speed of the motor is less than a first preset rotation speed, the control circuit controls a d-axis current Id to be a non-zero positive value.

Optionally, the control circuit controls the d-axis current Id to decrease as the rotation speed of the motor increases.

Optionally, the control circuit controls the d-axis current Id to linearly decrease as the rotation speed increases.

Optionally, when the rotation speed of the motor is greater than the first preset rotation speed, the control circuit controls the d-axis current Id to be zero.

Optionally, the motor comprises a walking motor and a working motor, the walking motor drives the autonomous apparatus to move in the working area, and the working motor drives the autonomous apparatus to perform the preset work.

Optionally, after the motor starts rotating, the control circuit estimates the rotor position of the motor based on the resistance value of the motor measured before the motor rotates, and controls the operation of the motor according to an estimation result.

The present invention further provides an autonomous apparatus, moving and performing preset work in a defined working area, the autonomous apparatus including an energy module supplying energy to the autonomous apparatus, a walking motor, a working motor, a sensor circuit, and a control circuit, the walking motor obtaining the energy from the energy module, to drive the autonomous apparatus to move in the working area, the working motor obtaining the energy from the energy module, to drive the autonomous apparatus to perform the preset work, the sensor circuit detecting a working parameter and an environmental parameter of the autonomous apparatus, and transmitting a detection result to a control circuit, the control circuit controlling the operation of the walking motor and the working motor according to a signal transmitted by the sensor circuit, where the walking motor is a sensorless brushless motor, and before the walking motor rotates, the control circuit detects a stator resistance of the walking motor, and performs field oriented control (FOC) on the walking motor according to the detected stator resistance.

Optionally, the control circuit includes a PWM unit and an inverter circuit, the PWM unit applies a first voltage value V1 to any two phases of the brushless motor through the inverter circuit, so that a phase current flowing through the motor reaches a first current value I1, the PWM unit applies a second voltage value V2 to any two phases of the brushless motor through the inverter circuit, so that the phase current flowing through the motor reaches a second current value I2, and a calculation formula of the stator resistance is R=(V2−V1)/(I2−I1).

Optionally, in a process of applying a voltage to any two phases of the brushless motor by the PWM unit, a duty ratio is gradually increased until the phase current flowing through the motor reaches a first current value I1 or a second current value I2.

Optionally, when a rotation speed of the brushless motor is less than a first preset rotation speed, a d-axis current Id controlled by the control circuit is a non-zero positive value.

Optionally, the control circuit controls the d-axis current Id to increase as the rotation speed decreases.

Optionally, the control circuit controls the d-axis current Id to linearly increase as the rotation speed decreases.

Optionally, when the rotation speed of the brushless motor is greater than the first preset rotation speed, the d-axis current Id controlled by the control circuit is zero.

Optionally, the working motor is a sensorless brushless motor, and before the working motor rotates, the control circuit detects the stator resistance of the working motor, and performs FOC on the working motor according to the detected stator resistance.

Optionally, a method for detecting the stator resistance and a method for FOC are as described above.

Beneficial effects of the embodiments of present invention are as follows: before a motor is controlled to move, a control circuit measures the resistance value of the motor, so that the control circuit can accurately know a rotor position, to control the motor more reliably, thereby improving the control performance of the motor.

DETAILED DESCRIPTION

Figure 1:
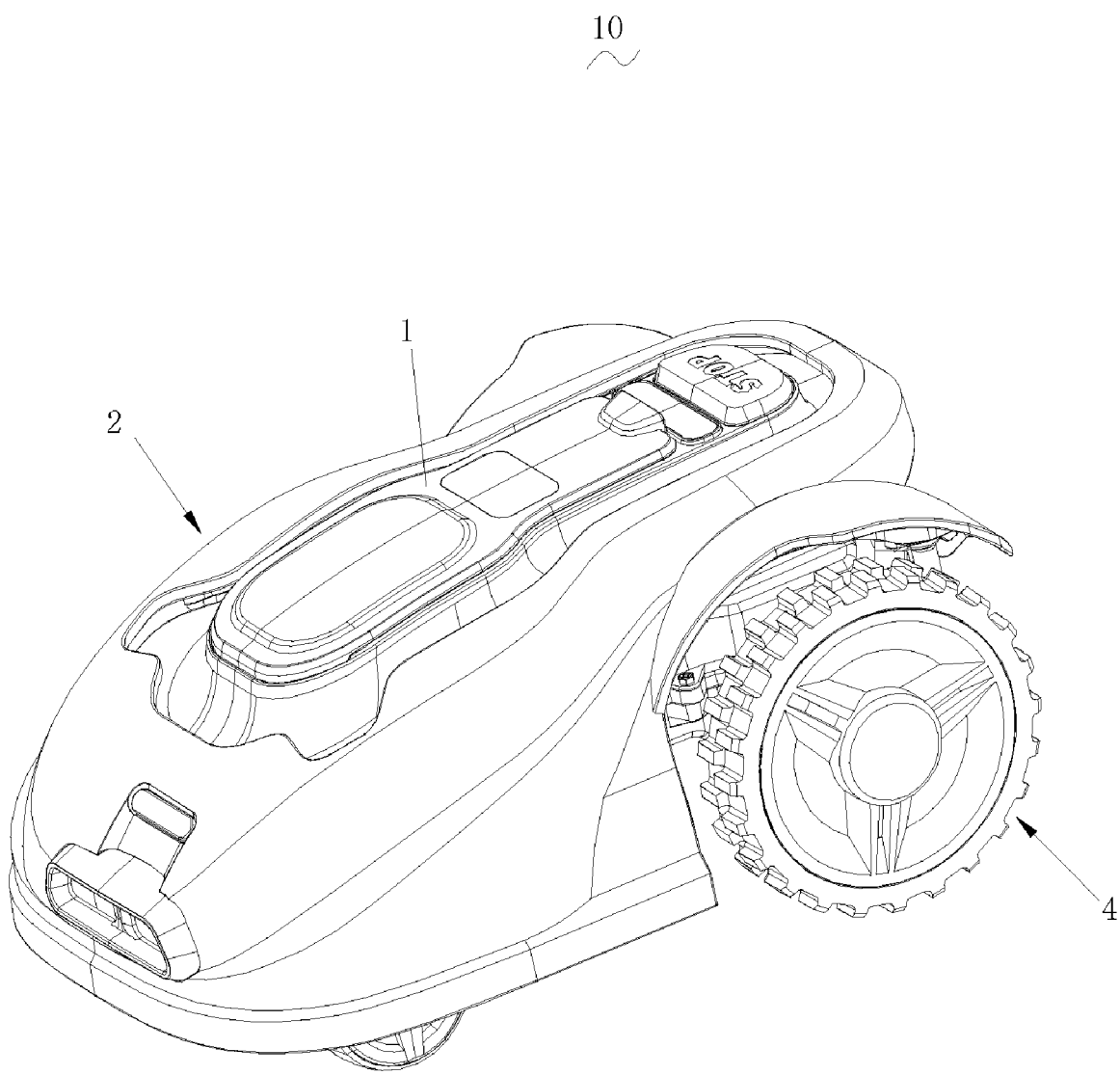
FIG. 1 is a three-dimensional schematic diagram of a lawnmower according to an embodiment of the present invention.
Figure 2:
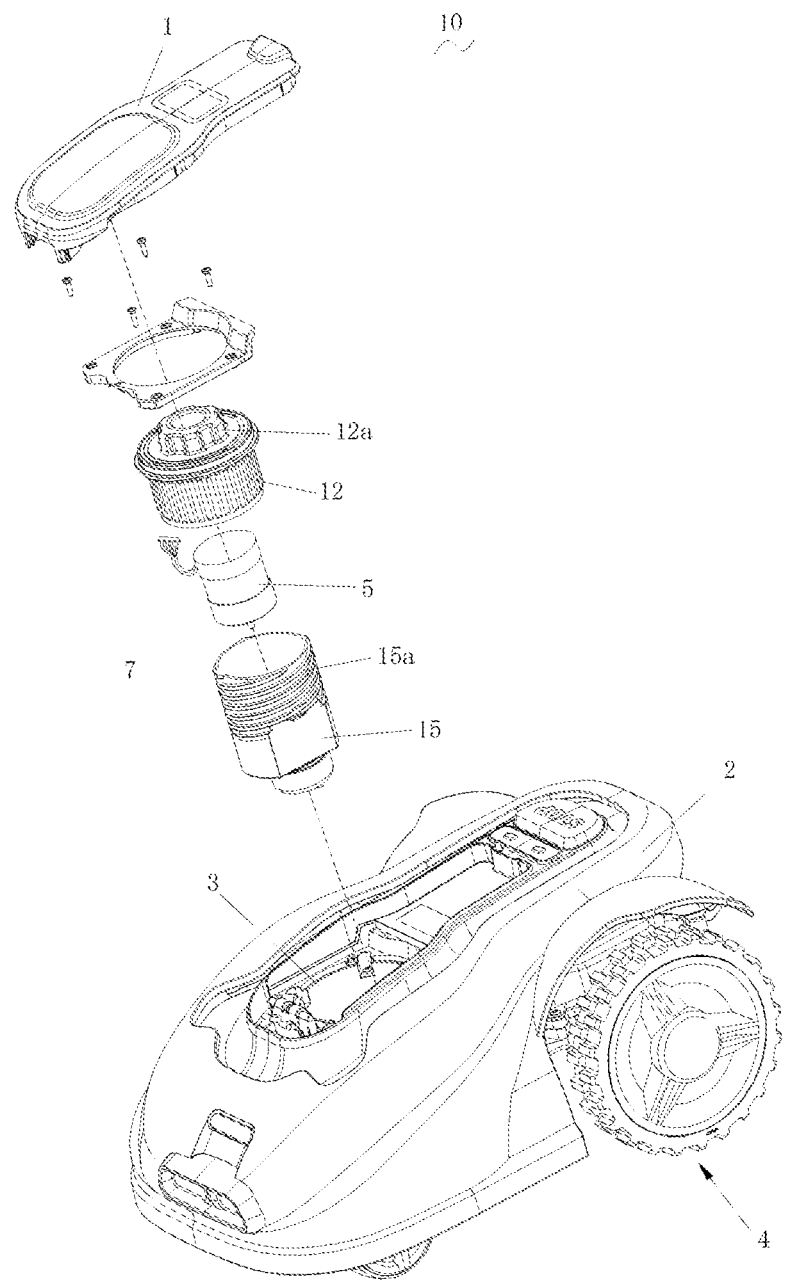
FIG. 2 is a partial three-dimensional exploded view of the lawnmower in FIG. 1, showing a mounting structure of a cutting motor.
Figure 3:
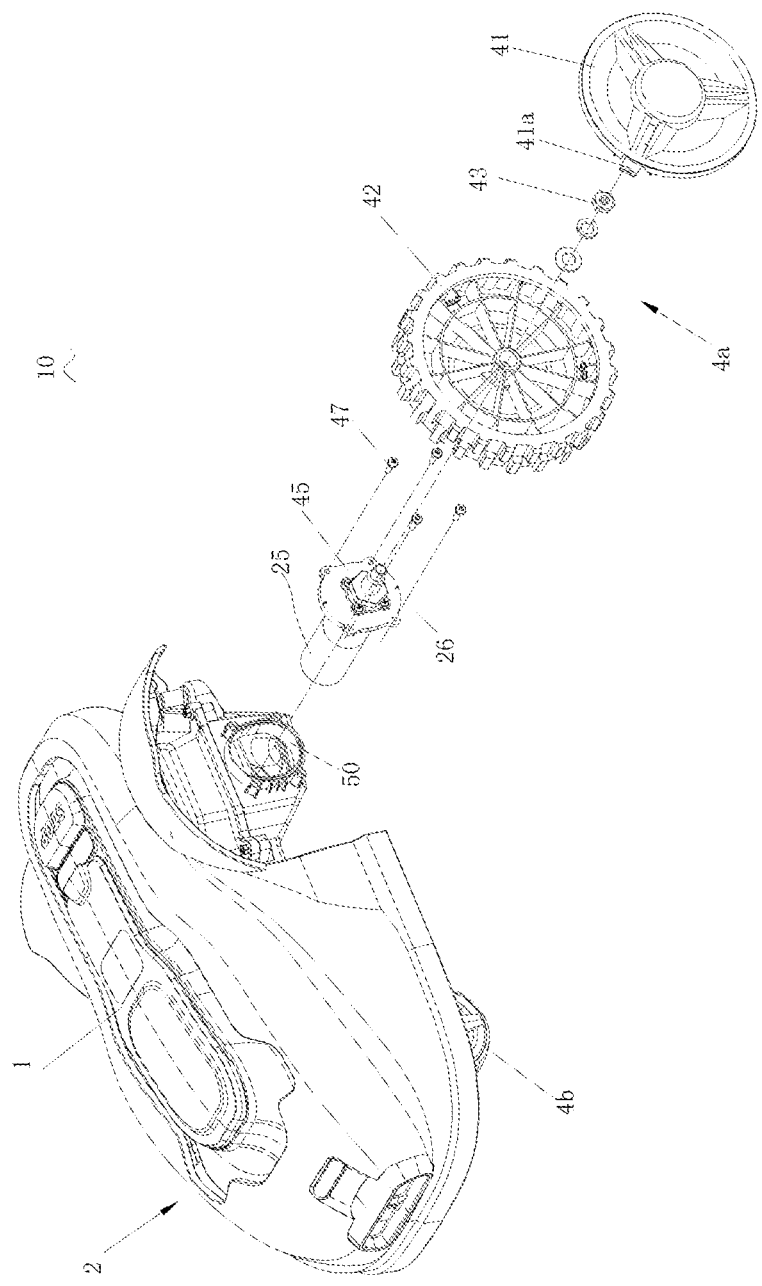
FIG. 3 is a partial three-dimensional exploded view of the lawnmower in FIG. 1, showing a mounting structure of a working motor.
Figure 4:
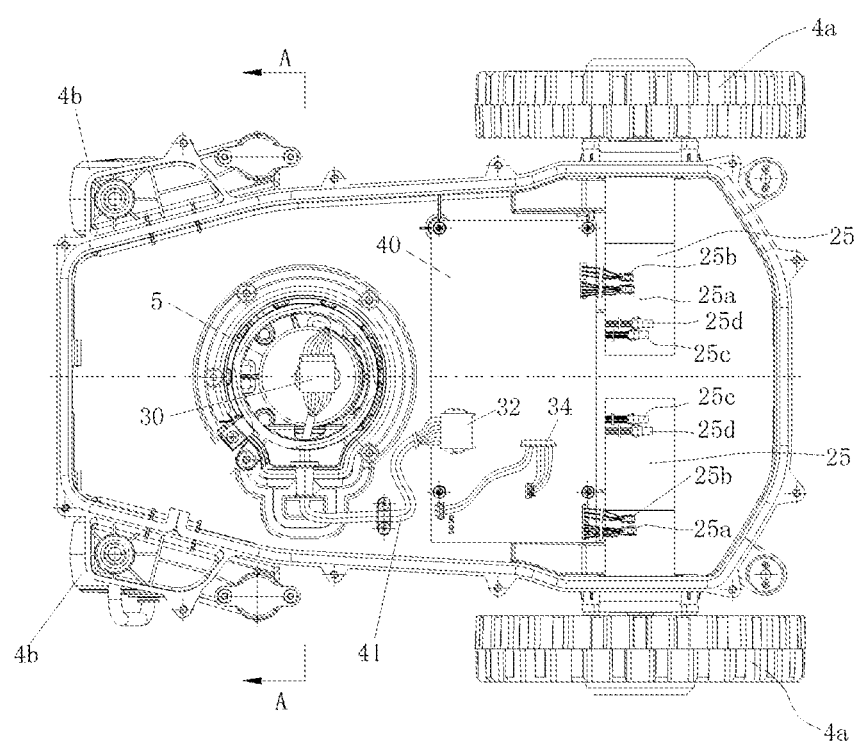
FIG. 4 is a schematic cross-sectional view of the lawnmower in FIG. 1 in a top-view direction after an upper housing is moved.

For ease of understanding the present invention, the present invention is described comprehensively below with reference to the accompanying drawings. Preferred embodiments of the present invention are provided by the accompanying drawings. However, the present invention can be implemented in many different forms, and is not limited in the embodiments described in the specification. On the contrary, an objective of providing the embodiments is to make the understanding of the disclosure content of the present invention more clearly and comprehensively.

Unless otherwise defined, meanings of all technical and scientific terms used in this specification are the same as that usually understood by a person skilled in the arty to which the present disclosure belongs. In this specification, terms used in the specification of the present disclosure are merely intended to describe objectives of the specific embodiments, but are not intended to limit the present disclosure. The term "and/or" used in this specification includes any or all combinations of one or more related listed items.

An autonomous apparatus provided by an embodiment of the present invention moves and performs preset work in a defined working area. The autonomous apparatus may be a robotic lawnmower that automatically performs a mowing function, a robotic vacuum cleaner that automatically performs a vacuum function, a robotic snowplow that automatically performs a snow removal function, or may be an intelligent working device that integrates a variety of functions. The autonomous apparatus includes an energy module supplying energy to the autonomous apparatus, a motor, a sensor circuit, and a control circuit. The motor obtains the energy from the energy module, to drive the autonomous apparatus to move and/or work in the working area. The sensor circuit detects a working parameter and an environmental parameter of the autonomous apparatus, and transmits a detection result to the control circuit. The control circuit controls the operation of the motor according to a signal transmitted by the sensor circuit. Optionally, the motor is a sensorless brushless motor, and before the motor rotates, the control circuit measures the resistance value of the motor, and estimates a rotor position of the motor according to the measured resistance value of the motor, to control the operation of the motor. Optionally, the motor includes a walking motor and a working motor. The walking motor drives the autonomous apparatus to move in the working area. The working motor drives the autonomous apparatus to perform the preset work.

Referring to FIG. 1 to FIG. 4, for example, the robotic lawnmower that automatically performs the mowing function is the autonomous apparatus, and an embodiment of the present invention is described.

A robotic lawnmower 10 includes: a housing 2, rollers 4 supporting the housing 2, a working motor 5, a walking motor 25, an energy module and a sensor circuit that are not shown, and a control circuit 40 controlling the working motor 5 and the walking motor 25 according to the sensor circuit.

The working motor 5 drives a cutting blade to implement mowing. Meanwhile, the height of the working motor 5 may be adjusted vertically, to cut grass of different heights. Specifically, a top cover 1 is movably disposed on the housing 2. An opening 3 is provided below the top cover 1. The housing 2 includes a base 15 for supporting and accommodating the working motor 5. The base 15 is detachably disposed in a cavity corresponding to the opening 3 in the upper portion of the housing 2. The base 15 is approximately cylindrical, and a peripheral wall of the base 15 is provided with an external thread 15a. An adjustment member 12 includes an approximately cylindrical body portion and a knob 12a that is at the top of the body portion for manual operation. An inner wall of the cylindrical body portion is provided with an internal thread engaged with the external thread 15a of the base 15. The adjustment member 12 operably drives the base 15 through the external thread 15a of the base 15 and the internal thread of the body portion of the adjustment member to move vertically, to drive the working motor 5 to move vertically, thereby implementing the adjustment of a cutting height.

Two walking motors 25 respectively drive a pair of drive wheels 4a disposed in parallel. A speed difference between the two walking motors 25 is adjusted to implement steering. The start and stop and forward and reverse rotation of the two walking motors 25 are adjusted to enable the robotic lawnmower to stop walking, move forward, reverse, and the like.

In the embodiments, an electrically conductive plug pair 30 is disposed between the working motor 5 and the control circuit 40. The plug pair 30 includes a first connector 32 connected to the control circuit 40 by a wire 41 and a second connector 34 connected to the working motor 5. The first connector 32 and the second connector 34 may be selectively connected or disconnected, so that the control circuit 40 and the working motor 5 can be electrically conducted or interrupted. Two plug pairs are disposed between the walking motor 25 and the control circuit 40. Specifically, a side, close to the walking motor 25, of the control circuit 40 is separately provided with a connector 25a and a connector 25b. The walking motor 25 is correspondingly provided with a connector 25c and a connector 25d that are respectively connected to the connector 25a and the connector 25b. The connector 25a may be selectively connected to or disconnected from the connector 25c, and the connector 25b may be selectively connected to or disconnected from the connector 25d, so that the control circuit 40 and the walking motor 25 can be electrically conducted or interrupted. When the working motor 5 and the walking motor 25 are connected to the control circuit 40, the control circuit 40 may selectively send a control instruction, to control the start, stop, steering, speed, and the like of the working motor 5 and the walking motor 25.

Figure 7:
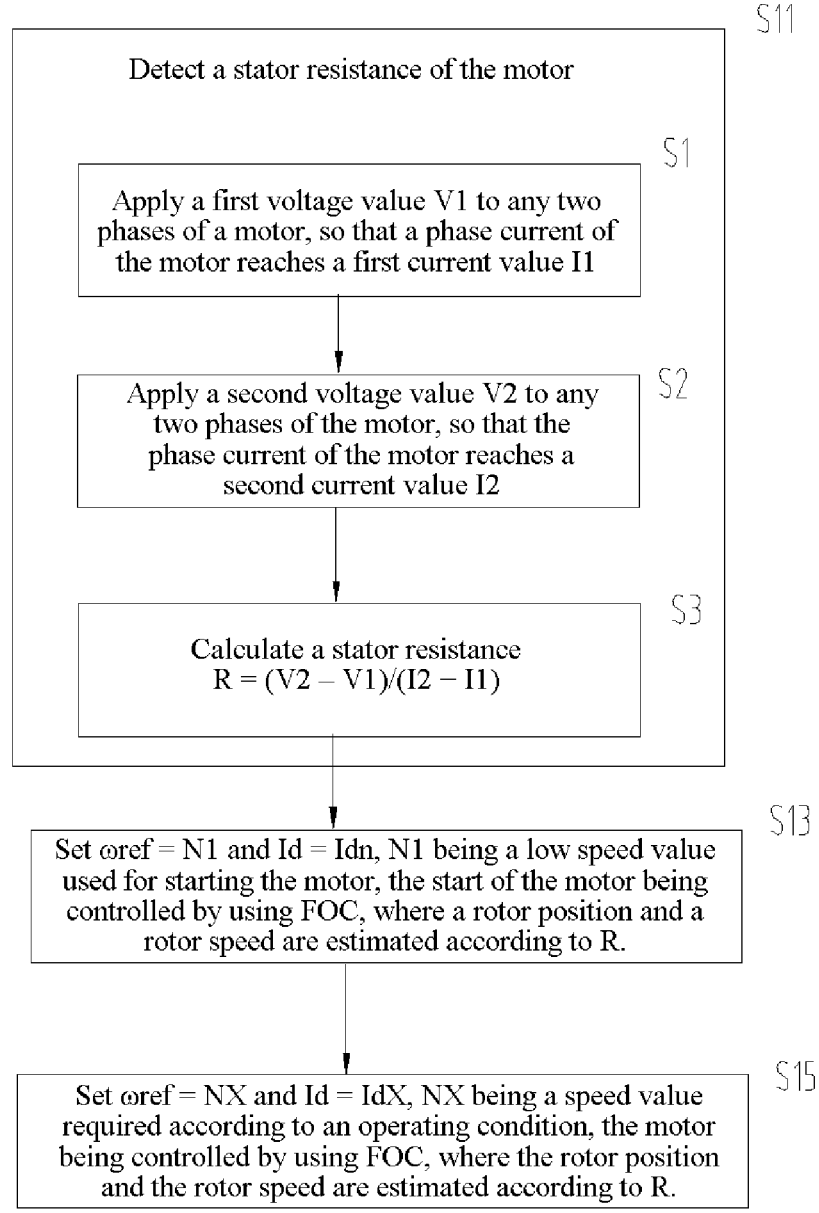
FIG. 7 is a flowchart of a second embodiment of an FOC method of the walking motor shown in FIG. 5.

A control process of the walking motor 25 is used as an example. The control process of the walking motor 25 is described with reference to FIG. 5 and FIG. 7.

Figure 5:
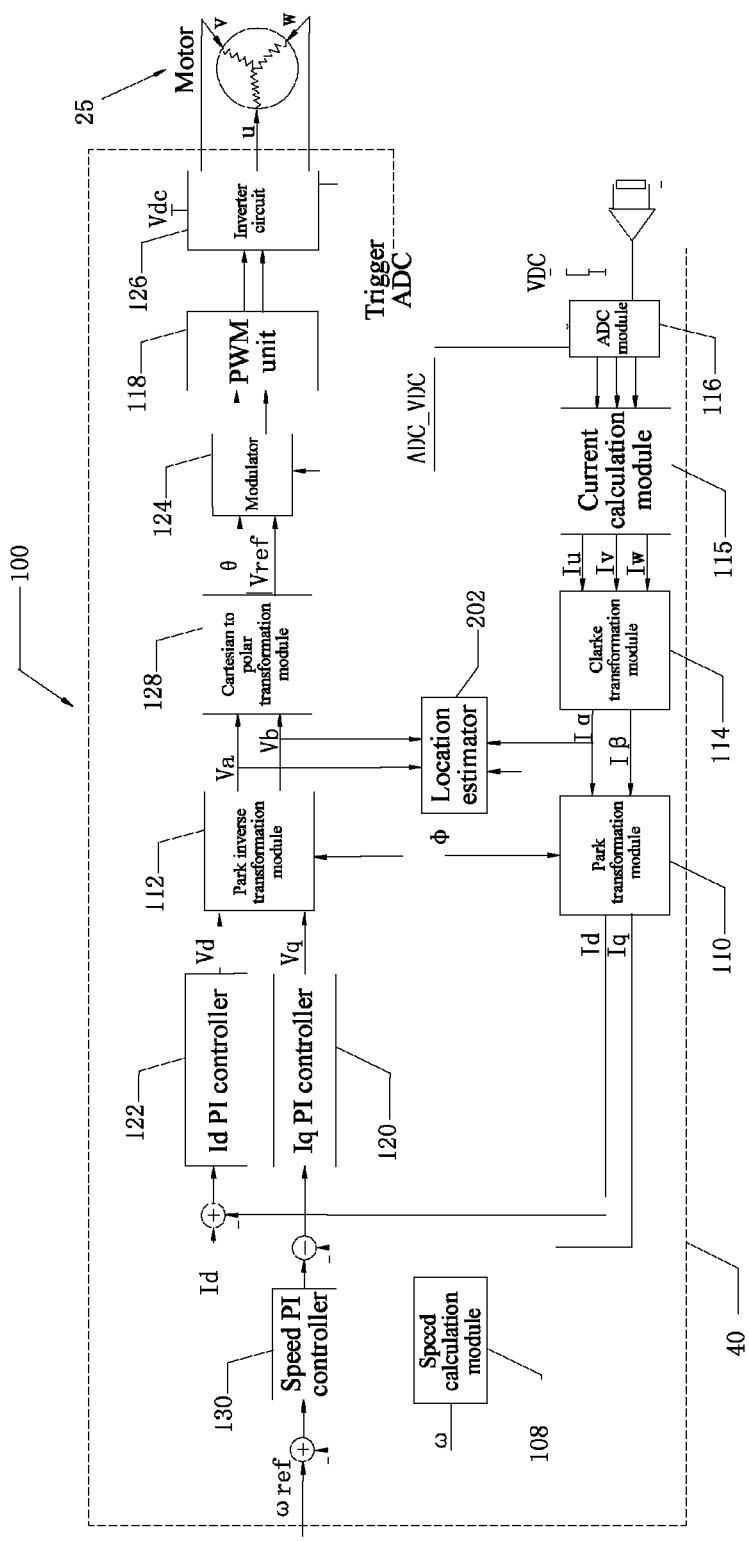
FIG. 5 is a diagram of an FOC structure arrangement of FOC of a walking motor of the lawnmower in FIG. 1.

FIG. 5 is a block diagram of an exemplary FOC structure arrangement 100. It may be understood that, another FOC structure arrangement, for example, an FOC structure arrangement that does not have Park inverse transformation, an FOC structure arrangement that does not have Park inverse transformation in a fast current control ring but has Park inverse transformation in a slow current control ring, or an FOC structure arrangement that has neither Park transformation nor Park inverse transformation, may be used. The control process of the walking motor 25 is described herein only with reference to the structure arrangement 100 shown in FIG. 5.

As shown in FIG. 5, the control circuit 40 includes an ADC module 116 acquiring a bus voltage VDC and a phase current, a current calculation module 115 that is connected to the ADC module 116 and calculates the acquired current, a Clarke transformation module 114 that is connected to the current calculation module 115 and performs Clarke transformation on a three-phase current, a Park transformation module 110 and a location estimator 202 that are connected to the Clarke transformation module 114, a speed calculation module 108, a speed PI controller 130, Id PI controller 122, Iq PI controller 120, a Park inverse transformation module 112, a Cartesian to polar transformation module 128, a modulator 124, a PWM unit 118, and an inverter circuit 126.

Based on the FOC structure arrangement 100 shown in FIG. 5, the control process of the motor 25 is as follows: an input parameter is received on an input side, and includes a reference speed (for example, an expected speed of the walking motor 25) and a d-axis current Id (for example, zero, a non-zero positive value or a non-zero negative value). After the received input parameter and the rotor position and speed that are obtained in a senseless manner are controlled by PI and transformed correspondingly, a magnitude |Vref| and an angle θ of a space vector of the stator resistance are obtained and transmitted to the modulator 124. The modulator 124 receives signals of the magnitude |Vref| and the angle θ, combines the signals and a signal of the bus voltage VDC transmitted by the ADC module 116 to generate a three-phase duty ratio signal (a PWM signal), and transmits the PWM signal to the PWM unit 118. The PWM unit 118 controls the work of the inverter circuit 126 according to the signal transmitted by the modulator 124, to control the three-phase motor 25 to operate according to the inputted reference speed. Typically, the inverter circuit 126 is a circuit formed by six MOS-FETs that control the energization sequence and energization time of three-phase windings of the three-phase motor 25.

As described above, the rotor position and the rotor speed are respectively obtained from the location estimator 202 and the speed calculation module 108. The location estimator 202 and the speed calculation module 108 may respectively estimate the rotor position and the rotor speed based on a BEMF flux estimator, a PLL estimator, an SMO or similar parts. The estimators need to use accurate parameter information (such as a stator resistance R and a stator inductance L) of the motor 25 to estimate the rotor position and/or speed, and are therefore sensitive to changes in R and L. However, the stator resistance R of the motor may highly depend on temperature. For example, if the temperature rises from 20° C. to 40° C., the resistance of copper or aluminum that is commonly used as a winding material for the motor increases by more than 15%. Such a random resistance change may introduce an error into the speed calculation module 108 and the location estimator 202, and the control performance may deteriorate, especially during a starting phase, the motor may fail to start.

To prevent the motor from failing to start, an embodiment of the present invention provides a method for measuring the stator resistance of the motor before the motor is started. A measured resistance value is provided as motor parameter information to the location estimator 202 and the speed calculation module 108, so that the location estimator 202 and the speed calculation module 108 can precisely calculate the rotor position and speed of the motor. In other implementations, the stator inductance of the motor may be alternatively detected, and the detected inductance is provided as the motor parameter information to the location estimator 202 and the speed calculation module 108, so that the location estimator 202 and the speed calculation module 108 can precisely calculate the rotor position and speed of the motor. In other implementations, both the stator resistance of the motor and the stator inductance of the motor may be detected, and the detected resistance and inductance are provided as the motor parameter information to the location estimator 202 and the speed calculation module 108, so that the location estimator 202 and the speed calculation module 108 can precisely calculate the rotor position and speed of the motor. The basis of motor control is to obtain the rotor position. Therefore, the control circuit 40 can precisely control the motor after the precise rotor position is obtained.

Figure 6:
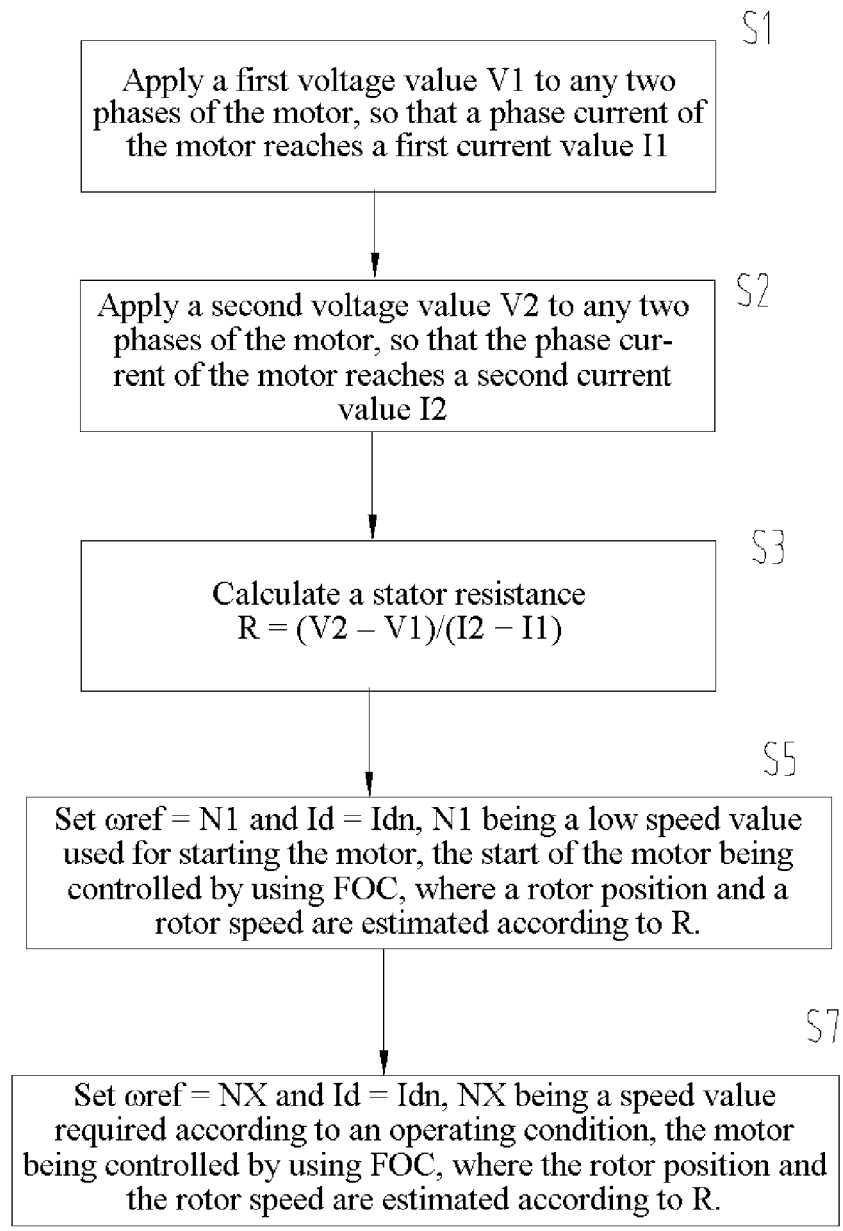
FIG. 6 is a flowchart of a first embodiment of an FOC method of the walking motor shown in FIG. 5.

FIG. 6 shows a first embodiment of a control process of a motor. In this embodiment, the resistance of the motor is detected first before the motor is started. After the motor is started, the resistance of the motor is no longer repeatedly measured, and the resistance value of the motor measured before the motor is started keeps being used to estimate a rotor position. A specific control method includes the following steps.

Step S1: Apply a voltage to any two phases (a UV phase, a UW phase or a VW phase) of the motor, so that a phase current flowing through the motor reaches a first current value I1. In a process of applying the voltage, a duty ratio of a PWM signal is gradually increased until it is detected that the phase current flowing through the motor reaches the first current value I1, and a motor phase voltage V1 is recorded at this time.

Subsequently, step S2 is performed: Apply a voltage to any two phases (the UV phase, the UW phase or the VW phase) of the motor, so that the phase current flowing through the motor reaches a second current value I2. In a process of applying the voltage, the duty ratio of the PWM signal is gradually increased until it is detected that the phase current flowing through the motor reaches the second current value I2, and a motor phase voltage V2 is recorded at this time. I2 is greater than I1. In other embodiments, I2 may be alternatively less than I1. In step S1 and step S2, the motor is kept stationary.

Subsequently, step S3 is performed: Calculate the stator resistance. $R=(V2-V1)/(I2-I1)$. Therefore, the control circuit 40 completes the measurement of the resistance of the motor. Next, the control circuit 40 estimates rotor position based on the measured resistance value of the motor and starts the motor.

Step S5 is performed: To start the motor smoothly, set $\omega ref$ shown in FIG. 5 to, instead of a target rotation speed, a relatively small speed N, for example, 100 rpm, at the beginning of start, and at the same time set "Id" to a fixed value Idn. The motor 25 is started according to closed-loop control shown in FIG. 5. During the closed-loop control shown in FIG. 5, the location estimator 202 and the speed calculation module 108 perform calculation according to a stator resistance value detected in step S11. Idn may be any fixed value of zero, a positive value, and a negative value. Once the motor is started, the control circuit is gradually increased to the rotation speed of the motor until the rotation speed of the motor reaches the target rotation speed. The target rotation speed is the rotation speed set according to a requirement of the autonomous apparatus, and step S7 is performed.

Step S7: The control circuit sets $\omega ref$ to, for example, 2000 rpm, 300 rpm or 10000 rpm, according to a rotation speed required by the autonomous apparatus, and sets "Id" to a fixed value Idn at the same time. Relative to Idn in step S5, Idn does not change. Subsequently, the motor 25 is driven according to the closed-loop control shown in FIG. 5 to run at the set rotation speed. During the closed-loop control of the motor according to the FOC structure arrangement shown in FIG. 5, the location estimator 202 and the speed calculation module 108 keep performing calculation based on the stator resistance value detected in step S11, and the stator resistance no longer needs to be repeatedly calculated. The speed calculation module 108 in this embodiment may calculate an actual speed value according to an estimation result of the location estimator 202, to intuitively reflect the rotor speed; and can also calculate the number of changes in the rotor position within a unit time, and indirectly reflect the rotor speed.

To further improve the starting performance of the motor, in addition to the detection of the stator resistance, the input parameter of the starting control of the motor is optimized. Specifically, referring to a second embodiment of the motor control shown in FIG. 7, the motor control includes the following steps.

Step S11: Detect a stator resistance. A specific method is shown by step S1 to step S3 in FIG. 6.

Step S13 is performed: Set $\omega ref$ shown in FIG. 5 to a relatively small speed N, for example, 100 rpm, and at the same time set "Id" to a fixed value Idn. The motor 25 is started according to closed-loop control shown in FIG. 5. During the closed-loop control of the motor according to the FOC structure arrangement shown in FIG. 5, the location estimator 202 and the speed calculation module 108 perform calculation according to the stator resistance value detected in step S11.

Optionally, when the speed value N changes, the value of Id changes to Idx accordingly. Optionally, when $\omega ref$ is in a low-speed range, Idx is a non-zero value. Optionally, when $\omega$rd is in a high-speed range, Idx is zero. Optionally, the low-speed range is from 100 rpm to 1000 rpm. That is, when $\omega ref$ is in the range of 100 rpm to 1000 rpm, Idx is a non-zero value. When $\omega ref$ exceeds 1000 rpm, Idx is zero.

In an optional embodiment, in the low-speed range, Idx gradually decreases as $\omega ref$ increases. A manner of decrease may be that Idx linearly decreases as $\omega ref$ increases or may be that Idx decreases based on the relationship of a function as $\omega ref$ increases, $Idx=F(\omega ref)$. It is not only in a starting process that $\omega ref$ and Idx maintain such a relationship. When $\omega ref$ switches back from a high speed to a low speed or is in a process of switching from a low speed to a high speed, there is always such a relationship between $\omega ref$ and Idx.

Step S15 is performed: Set $\omega ref$ set to, for example, 2000 rpm, 300 rpm or 10000 rpm, according to the rotation speed required by the autonomous apparatus. The value of Id is set at the same time according to the value of $\omega ref$, and the motor 25 is driven according to the closed-loop control shown in FIG. 5 to run at the set rotation speed. During the closed-loop control of the motor according to the FOC structure arrangement shown in FIG. 5, the location estimator 202 and the speed calculation module 108 perform calculation according to the stator resistance value detected in step S11. Refer to the description in step S13 for a specific setting method of Id.

Figure 8A:
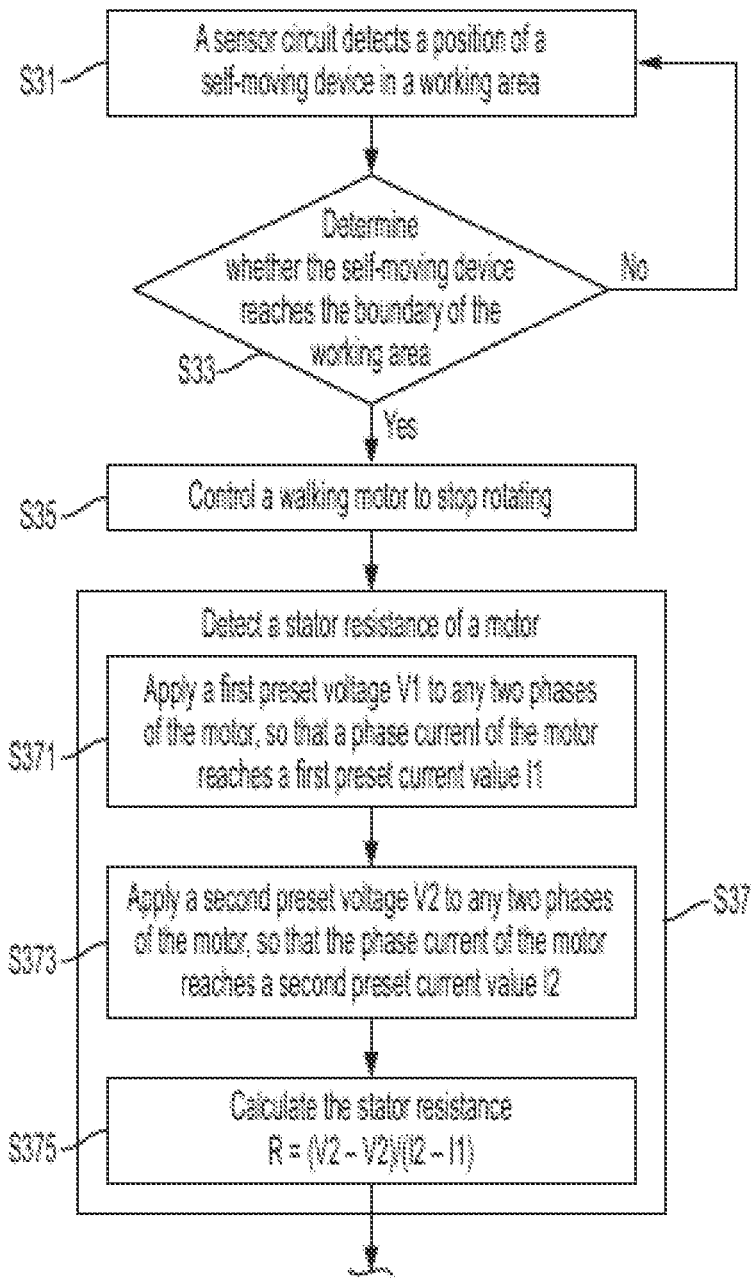
FIGS. 8A and 8B are working flowcharts of an FOC method of the walking motor shown in FIG. 5 in a specific scenario.
Figure 8B:
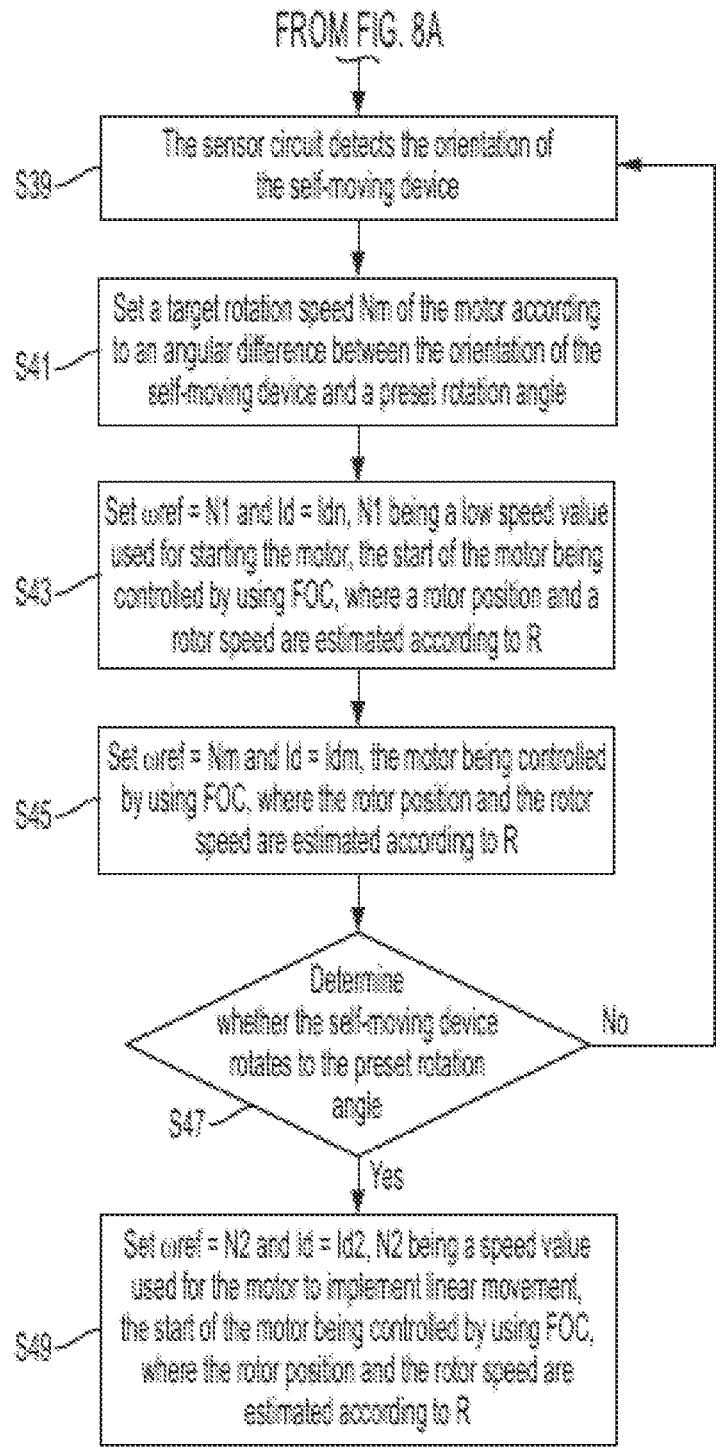

The entire control process of a specific scenario during the movement of the autonomous apparatus is described below with reference to FIGS. 8A and 8B. In the specific scenario, the autonomous apparatus needs to stop walking when moving to the boundary of a working area, and subsequently rotates to change an original walking direction to a preset rotation angle to keep walking forward.

Step S31: A sensor circuit detects a position of the autonomous apparatus in a working area, and transmits a detection result to a control circuit.

Step S33 is performed: Determine whether the autonomous apparatus reaches the boundary of the working area. If a determination result is yes, step S35 is performed, or otherwise, step S31 is performed.

Step S35: The control circuit controls the walking motor 25 to stop rotating, and sets both ωref and Id shown in FIG. 5 to zero.

Step S37 is performed: Detect a stator resistance of the motor 25. The method specifically includes the following steps:

Step S371: A PWM unit applies a voltage to any two phases (a UV phase, a UW phase or a VW phase) of the motor, so that a phase current flowing through the motor reaches a first current value I1. In a process of applying the voltage, a duty ratio of a PWM signal is gradually increased until a current sensor of the sensor circuit detects that the phase current flowing through the motor reaches the first current value I1, and a motor phase voltage V1 is recorded at this time.

Subsequently, step S373 is performed: The PWM unit applies the voltage to any two phases (the UV phase, the UW phase, or the VW phase) of the motor, so that the phase current flowing through the motor reaches a second current value I2. In a process of applying the voltage, the duty ratio of the PWM signal is gradually increased until the current sensor of the sensor circuit detects that the phase current flowing through the motor reaches the second current value I2, and a motor phase voltage V2 is recorded at this time. I2 is greater than I1. In other embodiments, I2 may be alternatively less than I1. In step S1 and step S2, the motor is kept stationary.

Subsequently, step S375 is performed: Calculate the stator resistance, $R=(V2-V1)/(I2-I1)$.

After step S37 is completed, step S39 is performed. Step S39: An acceleration sensor in the sensor circuit detects a current orientation of the autonomous apparatus, and transmits a detection result to the control circuit.

Step S41 is performed: The control circuit sets a target rotation speed Nm of the motor 25 according to an angular difference between the current orientation of the autonomous apparatus and a preset rotation angle. As the motor 25 rotates, the current orientation of the autonomous apparatus is increasingly close to the preset rotation angle, and the target rotation speed Nm changes accordingly, to ensure that the autonomous apparatus can exactly rotate to the preset rotation angle.

Step S43 is performed: Set ωref shown in FIG. 5 to a low-speed starting rotation speed N, for example, 100 rpm, and at the same time, set "Id" to a non-zero fixed value Idn. The motor 25 is started according to closed-loop control shown in FIG. 5. During the closed-loop control of the motor according to the FOC structure arrangement shown in FIG. 5, the location estimator 202 and the speed calculation module 108 perform calculation according to the stator resistance value detected in step S37. After the motor is started, the step S45 is performed.

Step S45 is performed: Set ωref shown in FIG. 5 to a target rotation speed Nm, for example, 300 rpm, and at the same time, set "Id" to a non-zero fixed value Idm. The motor 25 is started according to closed-loop control shown in FIG. 5. During the closed-loop control of the motor according to the FOC structure arrangement shown in FIG. 5, the location estimator 202 and the speed calculation module 108 perform calculation according to the stator resistance value detected in step S37. The value of Idm may be set according to an optional embodiment as follows.

Optionally, when the speed value N changes, the value of Id changes to Idx accordingly. Optionally, when ωref is in a low-speed range, Idx is a non-zero value. Optionally, when ωref is in a high-speed range, Idx is zero. Optionally, the low-speed range is from 100 rpm to 1000 rpm. That is, when ωref is in the range of 100 rpm to 1000 rpm, Idx is a non-zero value. When ωref exceeds 1000 rpm, Idx is zero.

In an optional embodiment, in the low-speed range, Idx gradually decreases as ωref increases. A manner of decrease may be that Idx linearly decreases as ωref increases or may be that Idx decreases based on the relationship of a function as ωref increases, Idx=F(ωref). It is not only in a starting process that ωref and Idx maintain such a relationship. When ωref switches back from a high speed to a low speed or is in a process of switching from a low speed to a high speed, there is always such a relationship between ωref and Idx.

Step S47 is performed: The control circuit determines whether the autonomous apparatus rotates to the preset rotation angle, where if a determination result is no, step S39 is performed, or if a determination result is yes, step S49 is performed.

Step S49: After the autonomous apparatus rotates to the preset rotation angle, control the autonomous apparatus by using a walking motor to move along a straight line according to a preset rotation speed. Based on this, the control circuit controls the motor 25 to operate according to a second target rotation speed N2. Optionally, the second target rotation speed N2 is 3000 rpm. 3000 rpm is greater than an upper limit value of the low-speed range, so Id is set to be zero. The motor 25 is controlled according to the closed-loop control shown in FIG. 5 to run. During the closed-loop control of the motor according to the FOC structure arrangement shown in FIG. 5, the location estimator 202 and the speed calculation module 108 perform calculation according to the stator resistance value detected in step S37.

It may be understood by a person skilled in the art that the foregoing detection method and control method of the stator resistance are also applicable to the working motor 5. Specific processes are not described herein again.

In an optional embodiment, the foregoing detection method and control method of the stator resistance are only implemented for the control of the walking motor 25. In another optional embodiment, the foregoing detection method and control method of the stator resistance are only implemented for the control of the working motor 5. In another optional embodiment, the foregoing detection method and control method of the stator resistance are simultaneously implemented for the control of the walking motor 25 and the working motor 5.

The method for measuring the resistance of a motor before the motor is started disclosed in the embodiments is suitable for an FOC control model and is also suitable for any other motor control model that does not depend on the detection of a rotor position by sensors.

Herein, it should be noted that, for a brushless motor, the resistance of the motor is a stator resistance. For other motors, the resistance of the motor is not necessarily the stator resistance. In this embodiment, only the brushless motor is used for description, and other motors are also applicable to embodiments of the present invention.

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only describe several implementations of the present disclosure, and their description is specific and detailed, and therefore cannot be understood as a limitation to the patent scope of the present disclosure. A person of ordinary skill in the art may further make some variations and improvements without departing from the concept of the present invention, and the variations and improvements belong to the protection scope of the present invention. Therefore, the protection scope of the patent of the present invention shall be defined by the appended claims.

What is claimed is:

1. An autonomous apparatus, traversing and performing preset work in a defined working area, the autonomous apparatus comprising:

an energy module configured to supply energy to the autonomous apparatus, a motor, a sensor circuit, and a control circuit, wherein the motor obtains energy from the energy module to drive the autonomous apparatus to traverse within the defined working area and perform work therein, wherein the sensor circuit detects a working parameter and an environmental parameter of the autonomous apparatus, and transmits a detection result to the control circuit, wherein the control circuit controls an operation of the motor according to a signal transmitted by the sensor circuit, wherein the motor is a sensorless brushless motor, and before the motor rotates, the control circuit measures a resistance value of the motor and estimates a rotor position of the motor based on the resistance value of the motor, to control the operation of the motor, wherein the control circuit comprises an inverter circuit, wherein the control circuit applies a first voltage value V1 to any two phases of the motor through the inverter circuit, so that a phase current flowing through the motor reaches a first current value I1, wherein the control circuit applies a second voltage value V2 to any two phases of the motor through the inverter circuit, so that the phase current flowing through the motor reaches a second current value I2, and wherein the control circuit measures the resistance value of the motor based on the first voltage value V1, the first current value I1, the second voltage value V2, and the second current value I2.

2. The autonomous apparatus according to claim 1, wherein in a process of applying a voltage to any two phases of the motor by the control circuit, a duty ratio is gradually increased until the phase current flowing through the motor reaches the first current value I1 or the second current value I2.

3. The autonomous apparatus according to claim 1, wherein the control circuit is a field oriented control (FOC) circuit.

4. The autonomous apparatus according to claim 3, wherein when the control circuit determines, based on the rotor position of the motor, that a rotation speed of the motor is less than a first preset rotation speed, the control circuit controls a d-axis current Id to be a non-zero positive value.

5. The autonomous apparatus according to claim 4, wherein the control circuit controls the d-axis current Id to decrease as the rotation speed of the motor increases.

6. The autonomous apparatus according to claim 5, wherein the control circuit controls the d-axis current Id to linearly decrease as the rotation speed increases.

7. The autonomous apparatus according to claim 4, wherein when the rotation speed of the motor is greater than the first preset rotation speed, the control circuit controls the d-axis current Id to be zero.

8. The autonomous apparatus according to claim 1, wherein the motor comprises a walking motor and a working motor, the walking motor drives the autonomous apparatus to traverse the working area, and the working motor drives the autonomous apparatus to perform the preset work.

9. The autonomous apparatus according to claim 1, wherein after the motor starts rotating, the control circuit estimates the rotor position of the motor based on the resistance value of the motor measured before the motor rotates, and controls the operation of the motor according to an estimation result.

* * * * *